United States Patent
Desprez et al.

(10) Patent No.: US 7,720,256 B2
(45) Date of Patent: *May 18, 2010

(54) IDENITFICATION TAG FOR POSTAL OBJECTS BY IMAGE SIGNATURE AND ASSOCIATED MAIL HANDLING

(75) Inventors: Olivier Desprez, Versailles (FR); Emmanuel Miette, Saint-Gratien (FR); Jean-Claude Merlivat, Paris (FR); Christophe Caillon, Bretigny sur Orge (FR)

(73) Assignee: Solystic, Gentilly Cedex (FR)

( * ) Notice: Subject to any disclaimer, the term of this patent is extended or adjusted under 35 U.S.C. 154(b) by 69 days.

This patent is subject to a terminal disclaimer.

(21) Appl. No.: 10/473,394

(22) PCT Filed: Jun. 12, 2003

(86) PCT No.: PCT/FR03/01765

§ 371 (c)(1),
(2), (4) Date: Sep. 30, 2003

(87) PCT Pub. No.: WO2004/002638

PCT Pub. Date: Jan. 8, 2004

(65) Prior Publication Data

US 2005/0123170 A1    Jun. 9, 2005

(30) Foreign Application Priority Data

Jun. 26, 2002    (FR) .................................. 02 07950

(51) Int. Cl.
*G06K 9/00* (2006.01)
*G06K 9/34* (2006.01)
*G06K 9/36* (2006.01)
*G06K 7/10* (2006.01)
*B07C 5/00* (2006.01)
*G06F 12/16* (2006.01)

(52) U.S. Cl. ........................ 382/101; 382/176; 382/286; 382/321; 209/559; 209/584; 705/406

(58) Field of Classification Search ................. 382/101, 382/102, 190, 176, 286; 235/462; 209/559, 209/584; 705/406
See application file for complete search history.

(56) References Cited

U.S. PATENT DOCUMENTS 4,992,649 A * 2/1991 Mampe et al. ............... 209/546

(Continued)

FOREIGN PATENT DOCUMENTS

EP    1 190 779 A2    3/2002

(Continued)

*Primary Examiner*—Wesley Tucker
*Assistant Examiner*—Andrae S Allison
(74) *Attorney, Agent, or Firm*—Sughrue Mion, PLLC (57) ABSTRACT

The method of processing objects, in which method a digital image (1) is obtained of the surface of each postal object, which image includes address information (2), and an identifier or time stamp for the postal object is associated with the digital image of the postal object in a video-coding system, is characterized by the fact that said digital image is processed in order to extract a signature that serves as an identifier. The signature comprises a first component representative of a physical characteristic of the digital image and a second component (SC) which is a textual description of the address block. This method can be used to implement immediate video-coding in a postal sorting machine without requiring a delay line.

9 Claims, 4 Drawing Sheets

U.S. PATENT DOCUMENTS

| | | | |
|---|---|---|---|
| 5,697,504 A * | 12/1997 | Hiramatsu et al. | 209/546 |
| 6,279,750 B1 * | 8/2001 | Lohmann | 209/559 |
| 6,697,500 B2 * | 2/2004 | Woolston et al. | 382/101 |
| 6,738,496 B1 * | 5/2004 | Van Hall | 382/101 |
| 6,888,084 B1 * | 5/2005 | Bayer | 209/584 |
| 6,909,789 B1 * | 6/2005 | Hansel et al. | 382/101 |
| 6,965,693 B1 * | 11/2005 | Kondo et al. | 382/190 |
| 7,069,253 B2 * | 6/2006 | Leon | 705/408 |
| 7,081,595 B1 * | 7/2006 | Brandt et al. | 209/584 |
| 2004/0005081 A1 * | 1/2004 | Arcas-Luque et al. | 382/101 |

FOREIGN PATENT DOCUMENTS

WO     WO 91/09688     7/1991

* cited by examiner

FIG_1

FIG_2

FIG_3

Fig. 4

IDENITFICATION TAG FOR POSTAL OBJECTS BY IMAGE SIGNATURE AND ASSOCIATED MAIL HANDLING

The invention relates to a method of processing postal objects, in which method a digital image is formed of the surface of a postal object, which digital image includes address information, and an identifier is associated with the digital image of the postal object in a data management system, in particular in a video-coding system.

In a postal sorting machine with video coding, the postal objects go past a camera that forms a digital image of each object, which image includes address information. The digital image is processed in a system for automatically evaluating addresses by means of optical character recognition (OCR). When the postal address can be evaluated completely by the evaluation system, the object is directed to a corresponding sorting outlet of the machine. When the postal address of an object cannot be evaluated completely, an identification code or time stamp (IdTag) for the postal object is printed in the form of a bar code on the surface of the object, and the digital image of the object is recorded in correspondence with the identification code of the object in a video-coding system. For a postal object having an envelope or wrapper made of a plastics material, a paper label is affixed to the object before the identification bar code is printed. Naturally, when processing a broad range of mail items, the postal sorting machine includes a detector for detecting items made of plastic so that a label is affixed only on a mail item having an outer envelope or wrapper that is made of a plastics material.

An object of the invention is to provide another method of processing postal objects that does not necessarily use a peripheral for printing bar codes, a plastics detector, and a system for affixing labels on postal objects having envelopes or wrappers made of plastic.

In the invention, a method of processing postal objects as defined above is characterized by the fact that the identifier associated with the digital image of a postal object is generated on the basis of processing said digital image. The identifier is an image signature that makes it possible to identify the postal object from among a set of postal objects. With this method of processing postal objects, it is not necessary to use a video-coding system to affix bar codes on the postal objects to be processed, and a postal sorting machine implementing the method of the invention can be simplified by omitting a peripheral for printing bar codes, a plastics detector, and a system for affixing labels on the postal objects.

In features of the method of the invention:

the identifier is a signature comprising a first component representative of a physical characteristic of the digital image, and a second component extracted from the digital image by optical character recognition;

the physical characteristic of the digital image is obtained by statistically analyzing the luminance of the pixels of the digital image;

the first component of the signature is constituted by data representative of the variation in the luminance values in the digital image;

the first component of the signature is constituted by data representative of the variation in the luminance values in distinct portions of the digital image;

the first component of the signature is constituted by histograms representative of the distribution of the luminance values in distinct portions of the digital image;

the distinct portions of the digital image result from various grids applied over the digital image;

the second component of the signature is constituted by data indicating the position of at least one information block in the digital image; and the second component is constituted by a textual description of at least one information block in the digital image.

The invention also provides a postal sorting machine including a video-coding system in which digital images of the surfaces of postal objects are recorded in a memory in correspondence with identifiers obtained using the above-defined method. More particularly, video-coding systems are known that operate in deferred time, as indicated above, and that include bar-code printing systems. Video-coding systems are also known that operate in real time and that do not necessarily use bar-code printing systems, but that require the presence of a delay line in the postal sorting machine. The postal sorting machine of the invention includes a video-coding system that operates almost in real time, and that does not use a delay line, and optionally that does not use a bar-code printing system either. If this postal sorting machine is equipped with a bar-code printing machine, the identification codes may advantageously be used with the signatures for retrieving the sorting data from the video-coding system.

The method of extracting signatures from the postal sorting machine of the invention is described below in more detail with reference to the accompanying drawings, in which.

The method of processing postal objects of the invention is designed to be implemented in a postal sorting machine including a video-coding system in which digital images of the surfaces of the postal objects are recorded in a memory in correspondence with identifiers.

Figure 1:
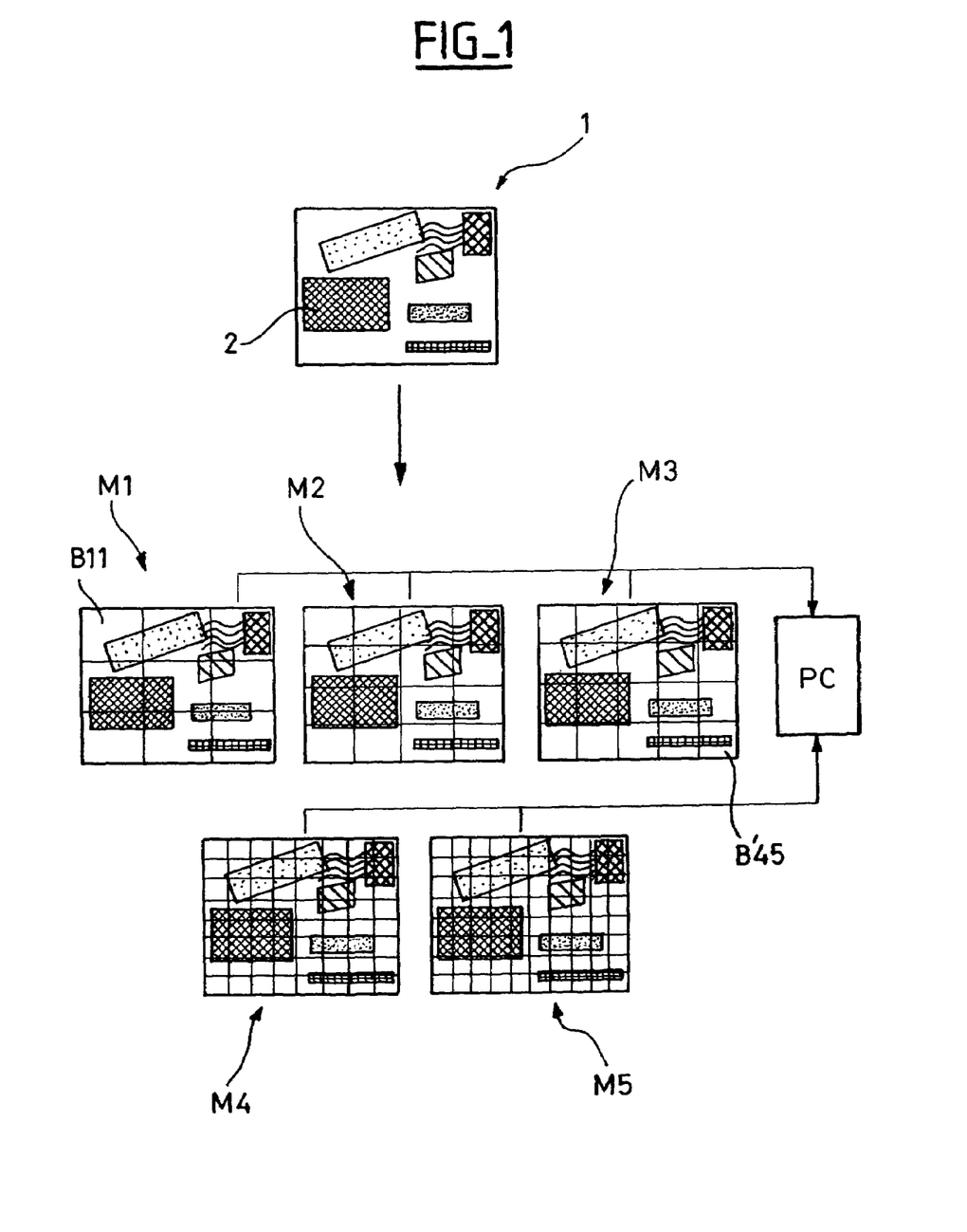
FIG. 1 is a very diagrammatic view showing how the first component of the signature of a postal object is extracted.

FIG. 1 shows a digital image 1 of a postal object, which is generally a digital image using a gray scale and including, inter alia, address information 2. The digital image 1 of a postal object including the address information 2 is processed automatically by a computer so as to generate an identifier for the postal object. The computer is generally part of the video-coding system.

Figure 2:
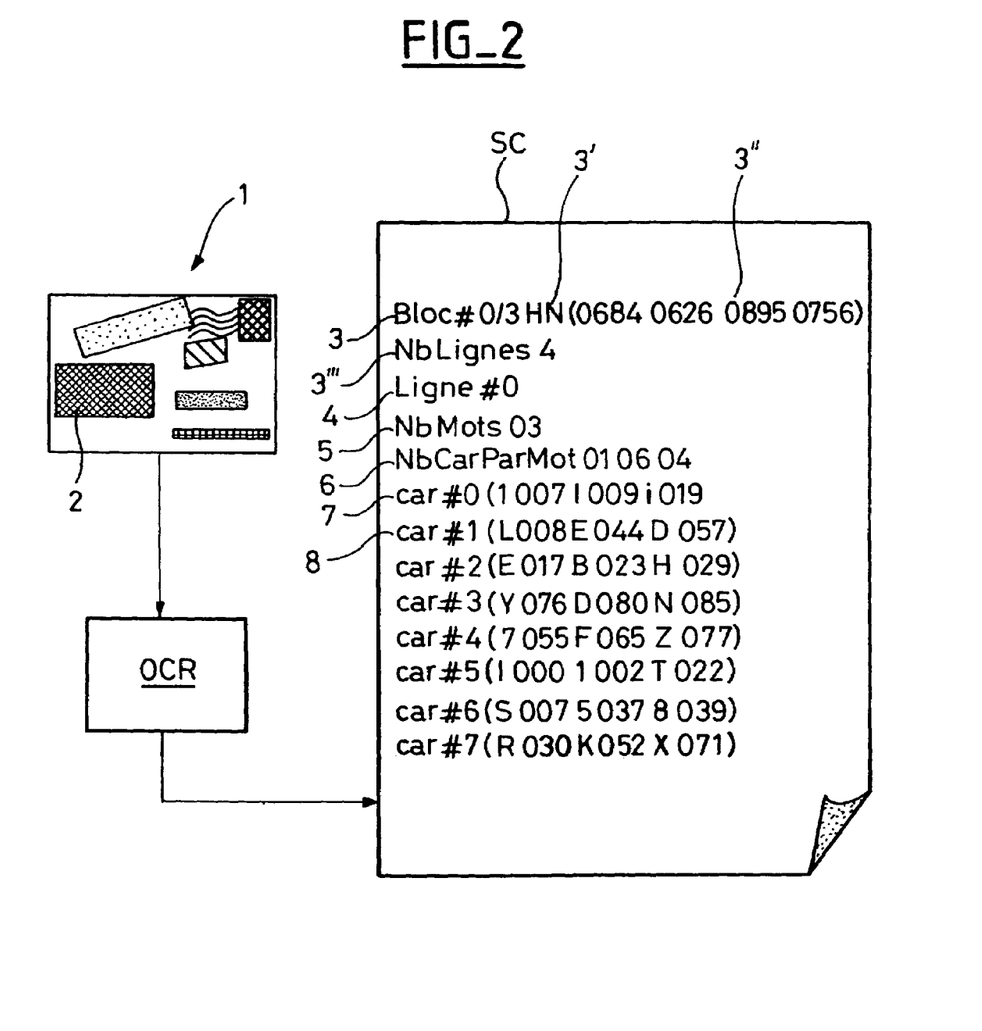
FIG. 2 is a very diagrammatic view showing how the second component of the signature of a postal object is extracted.

The identifier is a signature comprising a first component PC shown in FIG. 1, and a second component SC shown in FIG. 2. The two components PC and SC of the signature should in principle be independent from each other.

The first component PC is representative of a physical characteristic of the digital image 1, and is, for example, extracted by statistically analyzing the luminance of the picture elements (pixels) of the digital image 1 which has previously been subjected to a succession of filtering operations lowering the level of resolution of the image in order to reduce the processing time required for the statistical analysis, and in order to have contents of the low-frequency type which are relatively insensitive to fluctuations in luminance during multiple acquisitions. The luminance of a pixel of the image corresponds to the gray scale value of the pixel.

On the basis of the low-resolution digital image 1 of a postal object or item, it is possible to use computation to extract overall attributes such as the height and the width of the postal item, maximum, minimum, and mean luminance of the pixels of the digital image, and standard deviation, energy, and entropy of the luminance values.

It is also possible to use computation to extract local attributes relating to distinct portions of the digital image. FIG. 1 shows the digital image 1 subdivided into a plurality of distinct portions B11, B'45 resulting from various grids M1, M2, M3, M4, M5 being applied over the digital image 1. The grid M1 defines 3×3 distinct portions in this example. The grid M5 defines 8×10 distinct portions. The number of distinct portions in a grid and the number of grids may be a parameter in the statistical analysis applied to the digital image for the purpose of extracting the first component PC of the signature. On the basis of each portion such as B11 and B'45 of the digital image resulting from a grid such as M1 or M3, it is possible to extract local attributes such as the maximum, minimum, and mean luminance values of the pixels in this portion of the digital image, and also the standard deviation, energy, and entropy of the luminance values in this portion of the digital image. These local attributes contain discriminatory information, and the more varied the postal objects, the more discriminatory the information. It is also possible to extract a histogram from this portion of the digital image, which histogram is representative of the luminance values. A plurality of histograms may be extracted for distinct portions of the digital image 1, and they express information of discriminatory texture that is relatively insensitive to the small variations in the digital images formed successively for the same postal object.

The entire set of the overall and local attributes extracted for a digital image constitute the first component PC of the signature.

As shown in FIG. 2, the second component SC of the signature is extracted by an OCR system applied to the digital image 1 including address information 2. An OCR system conventionally used in a postal sorting machine is capable of supplying data indicating the positions of blocks of textual information detected in the digital image, such as the block containing the address information 2. Such position-indicating data may be constituted by the spatial and angular positioning coordinates of the rectangular zone forming the address block 2. The OCR system is also suitable for supplying a textual description of each information block detected in the digital image, in particular the address block 2. A textual description of an information block such as 2 may consist in an indication of the number of rows of characters detected in the information block, the number of words detected in each row of characters, or the number of characters detected in each word of each row characters.

FIG. 2 shows an example of a textual description of an information block constituting the second component SC of the signature of a postal object.

In FIG. 2:

"BLOC#0/3", designated by 3, references information block 0 from among the three information blocks detected in digital image 1;

"HN", designated by 3', is data giving the angular positioning of information block 0 in the digital image;

"(0684 0626 0895 0756)" designated by 3" are data representative of the spatial co-ordinates of information block 0 in the digital image;

"NbLignes 4", designated by 3''', indicates that the information block 0 contains four rows of characters;

"Ligne #0", designated by 4, references the first row of characters detected in information block 0;

"NbMots 03", designated by 5, is data indicating that three words have been detected in the first row of characters;

"NbCarParMot 01 06 04", designated by 6, are data indicating that the three words of the first row of characters contain 1, 6, and 4 characters, respectively;

. "car #0 (1 007 I 009 i 019)", designated by 7, are data indicating that, for the first character of the first row of characters, the OCR has identified three candidate characters, respectively 1, I, and i, with respective similarity distances of 007, 009, and 019;

"car #1 (L 008 E 009 D 057)", designated by 8, are data indicating that for the second character of the first row of characters, the OCR has identified three candidate characters, respectively L, E, and D, with respective similarity distances of 008, 009, and 057;

. . . and so on for the other characters of the first row of characters, given that a value 0 for the similarity distance is the shortest distance, i.e. it represents the smallest departure from the ideal character.

Generating a signature thus stems from the idea that a digital image of a postal object is an interpretable two-dimensional signal whose contents may be understood both physically and symbolically. Because the signature of a postal object is made up of two complementary components PC and SC, it is possible to distinguish between two postal objects having substantially the same postal address by discriminating between the first component PC of the signatures. Conversely, when comparing two signatures of the same postal object and extracted from respective ones of two digital images of that postal object, it is possible to base the comparison on the second components SC of the two signatures in order to recognize that the two signatures identify the same postal object.

Figure 4:
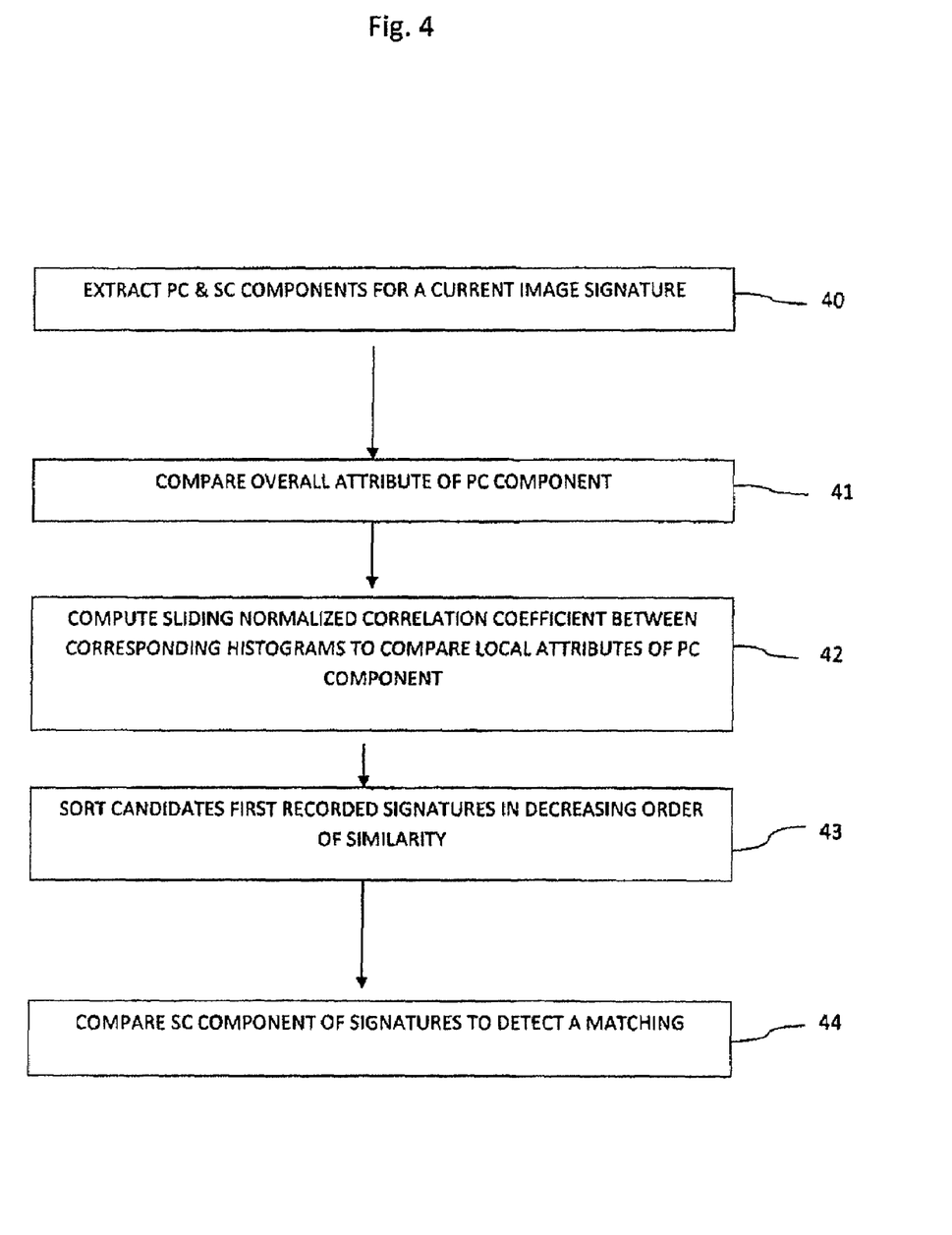
FIG. 4 is a flow diagram showing different steps for comparing two image signatures.

As shown in FIG. 4, starting from a current signature extracted in step 40 from a digital image of a postal object as indicated above, a search through a data management system for an identifier recorded in the form of a signature having two components PC and SC and which corresponds to the current signature is based on comparing the components PC and SC of the current signature with the corresponding components of the signatures recorded in the data management system.

Comparing the PC components of the signatures when the PC component is constituted by overall and local attributes as indicated above may begin with a comparison of the respective overall attributes in step 41, including thresholding of the absolute values of the variations of each overall attribute so as to perform initial filtering from among the signatures recorded in the management system. This filtering makes it possible to eliminate the signatures that are very dissimilar from the current signature, and to retain a small number of candidate signatures. Then local attributes of the PC components of the current signature and of the respective candidate signatures can be compared in order to reduce the number of candidate signatures. This comparison in step 42 may be based firstly on computing a sliding normalized correlation coefficient between the corresponding histograms in the current signature and in the respective candidate signatures, thereby making it possible to ignore any variations in luminance between the two digital images being compared, and then on computing a normalized correlation coefficient per type of attribute, between the other local attributes in the current signature and in the respective candidate signatures, thereby making it possible to overcome problems of normalization due to the difference in variability of each local attribute. The candidate signatures are then sorted in step 43 in decreasing order of similarity on the basis of the correlation coefficients and a fixed number of most similar candidate signatures are retained.

Comparison between the SC components of the signatures in step 44 can begin by measuring the similarity of the data indicating the positions of the information blocks so as to preselect candidate signatures. The candidate signatures can then be sorted in decreasing order on the basis of a measurement of similarity between the textual descriptions of the information blocks.

Comparison between the PC components may be preferred to comparison of the SC components or conversely as a function of the type of postal objects processed. For a batch of letters including a large proportion of handwritten letters, comparison of the PC components of the signatures is preferred when searching for a signature in the data management system. In contrast, for a batch of items in a mail shot, comparison between the SC components of the signatures is preferred.

Figure 3:
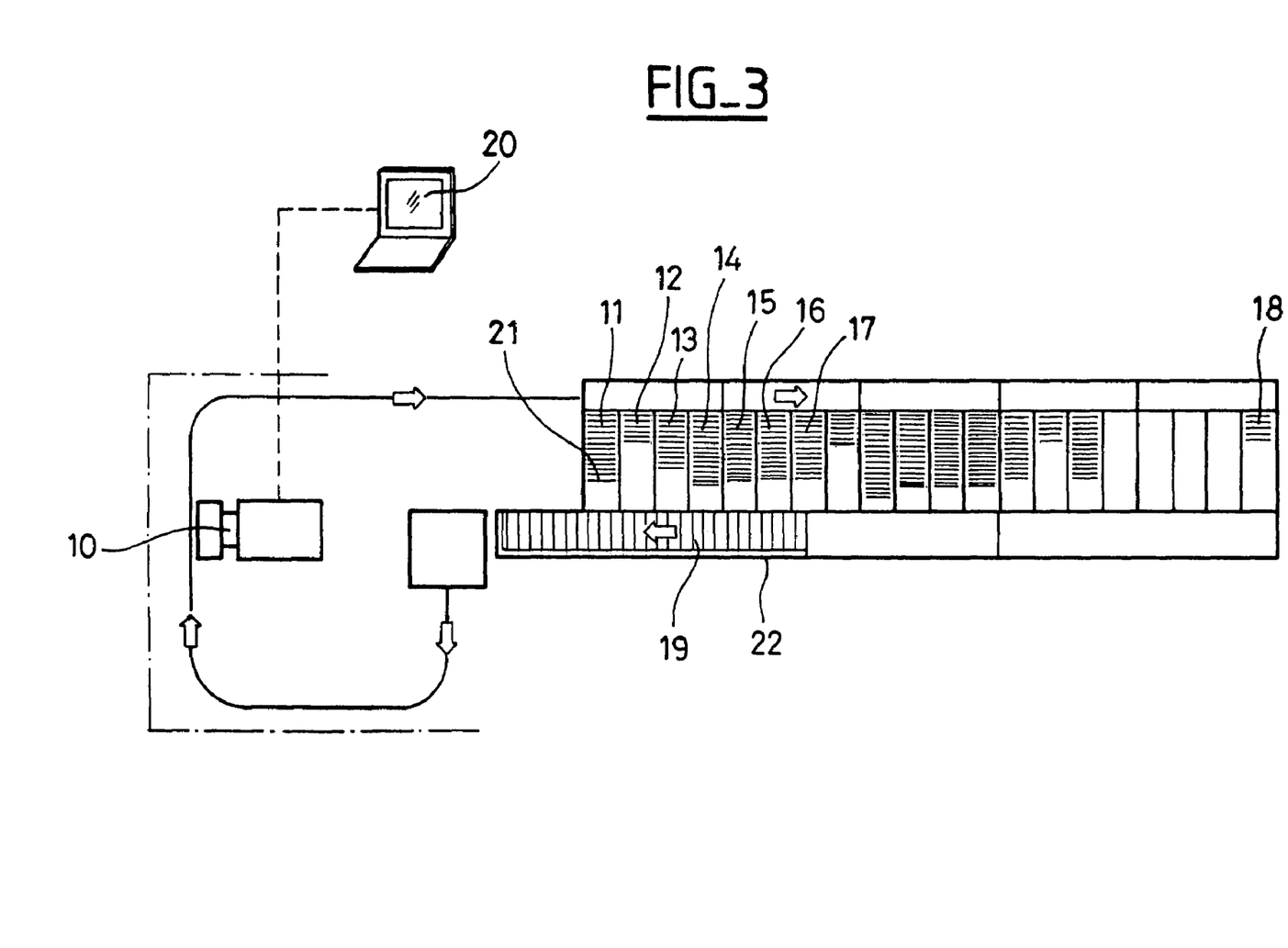
FIG. 3 is a very diagrammatic view showing a postal sorting machine using extraction of signatures from digital images of postal objects.

FIG. 3 shows a simplified postal sorting machine without a peripheral for printing bar codes and without a delay line, but with a video-coding system in which digital images 1 are recorded in correspondence with identifiers generated on the basis of the digital images as described above. The postal sorting machine is used more particularly for performing sorting to route the mail towards major destinations and post offices. It includes an automatic address recognition system 10 including a camera for forming a digital image of each object and an OCR for optical character recognition, and a set of sorting outlets or stackers 11-18 to which the postal objects as serialized by an unstacker 10' are directed. A certain number of stackers 11-14 referred to as "reject stackers", which are situated in the vicinity of the unstacker, and which are reserved for retrieving postal objects for which it is impossible to resolve the postal address automatically.

Such a postal sorting machines operates in three stages:

Stage 1: the operator loads the sorting plan into the machine and subjects the batch of mail 19 to be processed to a first sorting pass during which all of the letters are submitted to the automatic address recognition system 10. When the postal address is totally resolved, the letter is directed to a stacker constituting a sorting outlet. Otherwise, the letter is directed to a reject stacker. The reject letters are placed in stackers in chronological order, the first letters rejected being placed in a first reject stacker, the second letters rejected being placed in a second reject stacker adjacent to the first reject stacker and so on. By the time they are rejected, the reject letters have already been subjected to signature extraction as indicated above, and the digital images of the reject letters are recorded in a memory in the video-coding system 20 in correspondence with the signatures of the letters. Said signatures are recorded in a sequential memory file in chronological order of arrival of the letters in the reject stackers. Preferably, at least one separator mail item 21 is placed at the head of each reject stacker in order to be detected so as to identify the reject stacker (and its contents) before a second pass. Detecting the separator item 21 during the second pass of the reject letters through the sorting machine avoids any need for the operator to act on the sorting machine for processing the reject letters in the second pass.

Stage 2: this stage can start before the end of stage 1. As soon as operation starts, the digital images of the reject letters are processed by the video-coding system 20 in a manner that is conventional per se. The number of video-coding operators is preferably chosen so that all of the reject letters are processed within the two or three minutes that follow the end of the first pass.

Stage 3: the operator of the machine loads the reject letters into the magazine 22 of the unstacker in the chronological order in which they were discharged into the reject stackers. This loading can be achieved merely by sliding the reject letters to the magazine of the unstacker if the reject stackers are very close to the unstacker. When the separator mail item serialized by the unstacker 10' is detected by the bar-code reader (not shown in FIG. 3 but disposed upstream from the system 10 in the direction in which the letters flow, which direction is represented by arrows along the conveyor circuit), the sorting machine is configured for a second pass for the reject letters, as is known to the person skilled in the art. Then, in the automatic address evaluation system, another digital image is taken of each reject letter serialized by the unstacker, so that signature extraction can be performed again, on the basis of which, and by comparing signatures, sorting information is retrieved from the memory of the video-coding system. The reject letter is then directed to a corresponding sorting outlet. The reject letters for which it has not been possible to resolve the postal addresses via the video-coding system, or for which the retrieval of sorting information has not succeeded, are directed to a reject stacker for manual sorting.

The postal sorting machine shown in FIG. 3 has a video-coding system that operates immediately, unlike a deferred-time video-coding system, and it is not equipped with a delay line, unlike a real-time video-coding postal sorting machine. This results in a reduction in the cost of the machine and in a reduction in the risks of incidents occurring while processing the mail. The number of video-coding operators is equivalent to the number required for operation with deferred-time video-coding. It is easy to organize the postal sorting machine so that the letters rejected during the first pass are loaded merely by being slid onto the magazine of the unstacker. Thus, the letters rejected during the first pass do not leave the sorting machine and are subjected to a second pass, and this results in time being saved in processing the mail. Instead of separator mail items marking the start of the second pass, the start of the second pass could be indicated by an explicit action on the control console of the machine.

If the postal sorting machine is equipped with a bar-code printing system disposed downstream from the evaluation system 10, the video-coding system can store in a memory the codes for identifying the letters that are to undergo a second pass in correspondence with the signatures extracted for said letters. During the second pass of a reject letter, firstly the identification bar code is read by machine upstream from the evaluation system 10. If the identification code can be read correctly, it is used to retrieve the sorting information from the video-coding system 20. Otherwise, the signature of the reject letter is extracted by the system 10, and, on the basis of said signature, the sorting information is retrieved from the video-coding system 20 as indicated above. In order to accelerate the retrieval of the sorting information from the video-coding system, the last identification code recognized before the identification code (not recognized) of the current letter is kept in the memory, and it is used to locate the zone of the memory file in which the candidate signatures are recorded for the current signature, on the assumption that the signatures are recorded in chronological sequence in the signatures file in correspondence with the identification codes of reject letters.

The invention claimed is:

1. A method of processing postal objects, in which during a first sorting pass of postal objects, a first digital image of a certain level of resolution is formed of a surface of each object including postal address information for generating first image signatures recorded as object identifiers in a system for automatically evaluating postal addresses and directing said postal objects towards corresponding sorting outlets, and in which during a second sorting pass of said postal objects, a second digital image of said level of resolution is formed of the surface of each current postal object for generating a current image signature and in which said recorded first signatures are browsed in said system to detect a matching with said current signature, wherein each image signature generated from a postal object digital image including postal address information comprises a first component representative of physical characteristics of the digital image and a second component representative of characteristics of the address information in said image, wherein said first component comprises at least an overall attribute relating to the image as a whole and local attributes relating to distinct portions of said image, wherein said method further comprises the steps of:

lowering the resolution of said digital image to a low-frequency level to produce a low-frequency digital image,     subdividing said low-frequency digital image into several sets of image portions of different sizes corresponding respectively to different scales of subdivision and extracting from each image portion at least a histogram representative of a distribution of the luminance values of pixels in said image portion to generate said local attributes of each image signature,     and performing initial filtering among said first signatures by comparing said overall attribute of said current signature with said overall attribute of first signatures so as to provide candidate first signatures and after that comparing local attributes of said current signature with local attributes of said candidate first signatures to detect a matching, said comparison of local attributes being based on a computing of sliding normalized coefficient.

2. A method of claim 1, in which a second component of a first signature is also compared to a second component of said current signature to detect a matching.

3. A method of claim 2, in which said second component of a signature is computed from an OCR processing and comprises first data indicative of spatial position and orientation of address information block into an image and second data consisting of textual description of address information.

4. A method of claim 3, in which said comparison of second components of both first and current signatures begins by measuring a similarity between said first data of both said first and current signatures and continues by measuring a similarity between said second data of both first and current signatures to detect a matching.

5. A postal sorting machine in which a digital image is formed of the surface of a postal object, which image includes address information, and an identifier is associated with the digital image of the postal object in a video-coding system, said postal sorting machine being characterized in that it is organized to generate the identifier associated with the digital image of a postal object by implementing a method according to claim 1.

6. A postal sorting machine according to claim 5, including outlets in the form of stackers of which a certain number, referred to as reject stackers, are reserved for receiving reject postal objects whose postal addresses could not be evaluated during a first pass through the machine.

7. A postal sorting machine according to claim 6, in which at least one separator postal object is disposed at the head of a reject stacker for being detected before the reject postal objects are subjected to a second pass through the machine.

8. A postal sorting machine according to claim 5, including a system for printing and for reading bar codes identifying postal objects, and in which machine the identification codes are recorded in correspondence with the signatures in the video-coding system.

9. A postal sorting machine according to claim 8, in which signatures and identification codes are generated during a first pass of postal objects in the machine and in which, during a second pass in the machine of the same postal objects, the video-coding system is arranged to search a signature corresponding to a current postal object by using the identification code of a postal object preceding the current postal object in the second pass.

* * * * *

UNITED STATES PATENT AND TRADEMARK OFFICE
CERTIFICATE OF CORRECTION

| | | |
|---|---|---|
| PATENT NO. | : 7,720,256 B2 | Page 1 of 1 |
| APPLICATION NO. | : 10/473394 | |
| DATED | : May 18, 2010 | |
| INVENTOR(S) | : Olivier Desprez et al. | |

It is certified that error appears in the above-identified patent and that said Letters Patent is hereby corrected as shown below:

On Title Page Item (54) and Col. 1, line 1

Delete

"IDENITFICATION TAG FOR POSTAL OBJECTS BY IMAGE SIGNATURE AND ASSOCIATED MAIL HANDLING"

and Insert:

--IDENTIFICATION TAG FOR POSTAL OBJECTS BY IMAGE SIGNATURE AND ASSOCIATED MAIL HANDLING--

Signed and Sealed this
Eighteenth Day of January, 2011

David J. Kappos
*Director of the United States Patent and Trademark Office*